United States Patent [19]

Fukuzumi

[11] Patent Number: 5,579,603

[45] Date of Patent: Dec. 3, 1996

[54] PLANT GROWING METHOD FOR GREENING WALL SURFACES

[76] Inventor: Yutaka Fukuzumi, 34-1, Kami-Seya-Machi, Seya-ku, Yokohama-shi, Kanagawa-ken, Japan

[21] Appl. No.: 428,272

[22] Filed: Apr. 25, 1995

[51] Int. Cl.⁶ .............................. A01B 79/00; A01C 1/00
[52] U.S. Cl. ........................ 47/58; 47/66; 47/82
[58] Field of Search ................ 47/82, 83, 66 B, 47/58.1, 62

[56] References Cited

U.S. PATENT DOCUMENTS

| | | | |
|---|---|---|---|
| 3,613,309 | 10/1971 | Coburn | 47/66 B |
| 3,667,157 | 6/1972 | Longhini | 47/82 |
| 4,299,056 | 11/1981 | Towning | 47/66 B |
| 4,918,861 | 4/1990 | Carpenter et al. | 47/66 B |

FOREIGN PATENT DOCUMENTS

| | | | |
|---|---|---|---|
| 2314659 | 2/1977 | France | 47/66 B |
| 2680626 | 3/1993 | France | 47/82 |
| 3310883 | 9/1984 | Germany | 47/66 B |
| 2152345 | 8/1985 | United Kingdom | 47/83 |
| 2170688 | 8/1986 | United Kingdom | 47/82 |
| 2239155 | 6/1991 | United Kingdom | 47/82 |

*Primary Examiner*—Terry Lee Melius
*Assistant Examiner*—Joanne C. Downs
*Attorney, Agent, or Firm*—Emmanuel J. Lobato; Burns & Lobato, P.C.

[57] ABSTRACT

A plant-growing method for greening upright or slant wall surface is disclosed. A flexible bag is first prepared including a plurality of compartments sequentially juxtaposed in the direction of the overall length of the bag. The compartments are each provided with a plurality of openings communicating with the exterior. Soil is then loaded through the openings into the compartments with the bag being horizontally laid. Afterwards, trees are planted through the openings into the compartments. Thereupon, the bag which has been planted with the trees is suspended along the wall surface in the direction of the overall length of the bag while allowing trunks of the trees to be exposed through the openings. Water is thereafter supplied into the compartments of the bag to promote the growth of the trees.

2 Claims, 6 Drawing Sheets

PLANT GROWING METHOD FOR GREENING WALL SURFACES

BACKGROUND OF THE INVENTION

1. Field of the Invention

The present invention relates to a plant-growing method aiming at greening upright or slant wall surfaces of buildings or structures by means of trees.

2. Description of the Related Art

In the conventional methods of greening buildings, it is well known to cover the wall surfaces with ivy or to plant trees into the soil deposited on the wall surfaces. It is also known, in U.S. Pat. No. 5,257,476, issued to the present inventor, to prepare a plurality of bags loaded with soil, to pile them on the wall surfaces of the building and to insert trees' roots between the piled bags to plant trees.

However, the above method using ivy has a restriction that due to the nature of the ivy, the area and shape to be greened are not accurately defined, which results in an insufficient greening of the building. On the contrary, the method depositing soil on a wall surface requires problematic means for containing the soil to be deposited. For this reason, deferring from use of a simple case greening the window and its vicinity by use of planters or pots, it was necessary for large-scale greening to provide overhangs or frameworks for the soil containers. Accordingly, this method disadvantageously needed a large-scale reconstruction of wall surfaces of the building or structure, or alternatively a framework construction. It was also inconveniently necessary for the workers to climb up every maintenance or replanting period since the trees were fixedly located on the wall surfaces and to provide scaffolds for that work. This makes it substantially impossible to apply such a method to skyscrapers. Even the invention disclosed in the above-mentioned U.S. Pat. No. : 5,257,476 requires lattice fences for bearing the piled bags along the wall surfaces of the building. Consequently, what is desired is a method of greening the building free from such necessity for the lattice fences.

SUMMARY OF THE INVENTION

It is therefore an object of the present invention to provide a novel and improved plant-growing method whereby the above problems involved in the prior art can be overcome.

According to an aspect of the present invention, the plant-growing method of the present invention for greening upright or slant wall surfaces comprises the steps of preparing a flexible bag including a plurality of compartments sequentially juxtaposed in the direction of the overall length of the bag, the compartments each being provided with a plurality of openings communicating with the exterior; loading soil through the openings into the compartments with the bag being horizontally laid; planting trees through the openings into the compartments; suspending the bag which has been planted with the trees along the wall surface in the direction of the overall length of the bag while allowing trunks of the trees to be exposed through the openings; and supplying water into the compartments of the bag to promote the growth of the trees.

Preferably the openings formed in each compartment are each in the shape of a slit, whereupon the present invention will give rise to superior functions.

Thus, according to the plant-growing method of the present invention, firstly, the loading of the soil and the planting of the trees can be effected while laying the bag horizontally, which enables these works to be performed on the ground, not on the wall surface. Secondly, the same opening is used to perform all of the loading of soil, planting of a tree, and exposure of the trunk of the tree, resulting in a simple structure of the bag. Thirdly, the greening can be done by merely suspending the bag which has undergone these works along the wall surface in the direction of the overall length while allowing the trunks of the trees to be exposed through the openings, which will eliminate the necessity of providing a special overhang or framework on the wall surface and of causing the workings to work on the wall surface. Fourthly, the trees are expected to become horizontal by the effect of gravity upon the suspension irrespective of a slightly slant planting of the trees, which will contribute to the speed-up of the planting work. Fifthly, for the maintenance and replanting works, the suspended bag may be again laid down horizontally so that these works can be performed on the ground, not on the wall surface.

Furthermore, the opening in each compartment is shaped into a slit extending in the direction of the overall direction of the bag so as to present the following functions.

First, upon loading soil and planting trees with the bag being laid down horizontally, the compartments are bent in the direction in which the slit-like openings extend to thereby transform the slit-like openings into circular ones, thus facilitating the work. Second, upon the suspension of the bag after the completion of the work, the bag is pulled down in the direction of the overall length by its own weight whereby the slit-like openings are firmly closed to prevent the soil from spilling out.

BRIEF DESCRIPTION OF THE DRAWINGS

These and other aspects, objects, features and advantages of the present invention will be more clearly understood and appreciated from a review of the following detailed description of the preferred embodiments and appended claims, and by reference to the accompanying drawings, in which:

DESCRIPTION OF THE PREFERRED EMBODIMENTS

Figure 1:
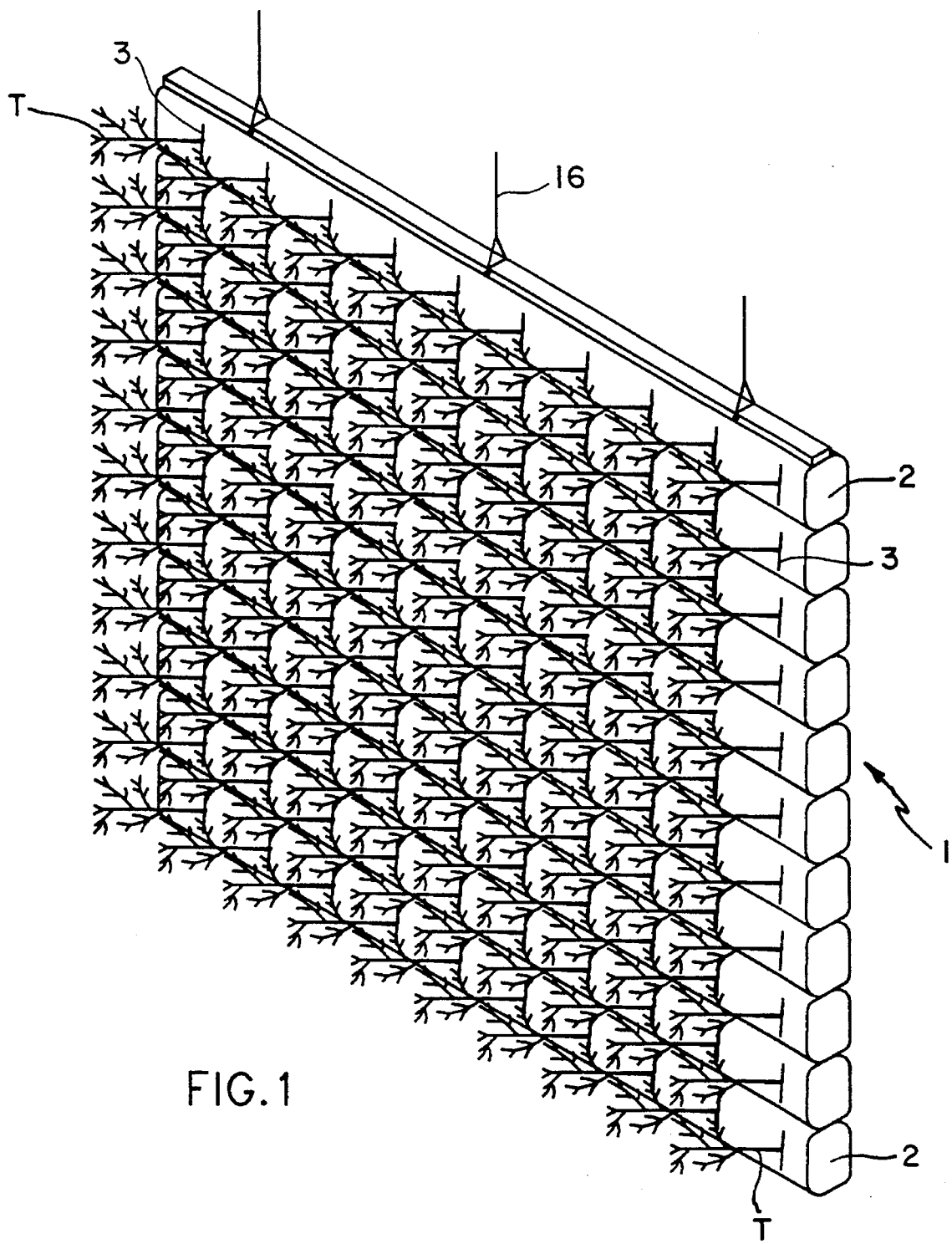
FIG. 1 is a perspective view of a wall surface greened by means of a plant-growing method according to an embodiment of the present invention.
Figure 2:
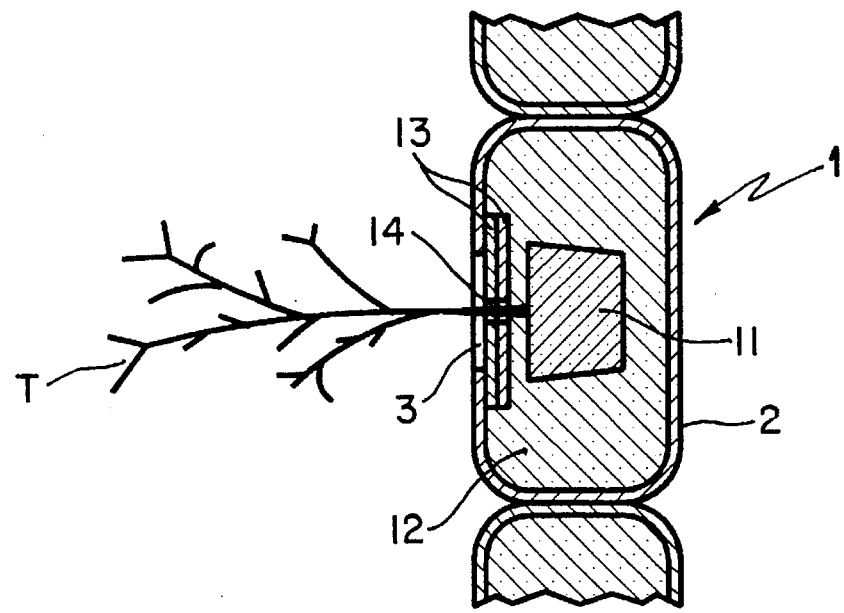
FIG. 2 is a sectional view showing a major part of FIG. 1.

A preferred embodiment of the present invention will now be described with reference to the accompanying drawings. FIG. 1 illustrates a wall surface greened by means of a plant-growing method according to the present invention. A bag generally designated 1 constitutes a device for implementing the method of the present invention. The bag 1 needs to have at least a flexibility with preferably some air permeability as well as waterproof properties. The material of the bag 1 can be, for instance, a nonwoven sheet made of polyester, nylon, polyethylene, polypropylene, etc. The bag 1 comprises a plurality of compartments 2 sequentially juxtaposed in the direction of the overall length of the bag 1, each compartment 2 containing soil therewithin. The compartments each include a plurality of openings 3 in the form of a slit extending along the direction of the overall length of the bag 1. The openings 3 are provided in such a manner as to correspond to the number of trees T arranged in each compartment 2 and to the intervals among the trees T. It is, however, natural that each compartment 2 may be subdivided for each opening or for each group of openings, if needed (partition walls available for this purpose are not shown).

FIGS. 4 to 7 illustrate a series of steps of the plant-growing method in accordance with the present invention. First the bag 1 is horizontally laid on the ground, for instance (the state depicted in FIG. 4). Then the compartments 2 of the bag 1 are bent in the direction where the slits extend so as to transform the slit-like openings 3 into circular ones, through which the soil 12 is loaded into each of the compartments (the state depicted in FIG. 5). This is followed by planting the trees T through the openings 3 into each of the compartments 2 containing the soil 12 (the state depicted in FIG. 6). In order to ensure a secure planting, this embodiment makes use of trees T which have been grown in given individual pots and thereafter pulled out from the pots with the soil 11 solidifying around their roots along the internal configuration of the pots. By use of suspensions 16 (see FIG. 1) the thus completed bag 1 is lifted up along the wall surface desired to be greened. At that time the bag 1 is tensioned by its own weight in the direction of its overall length, so that the openings of the openings 3 are tightly closed into their original slit-like ones, thereby preventing the soil from spilling out (the state depicted in FIG. 7).

Figure 8:
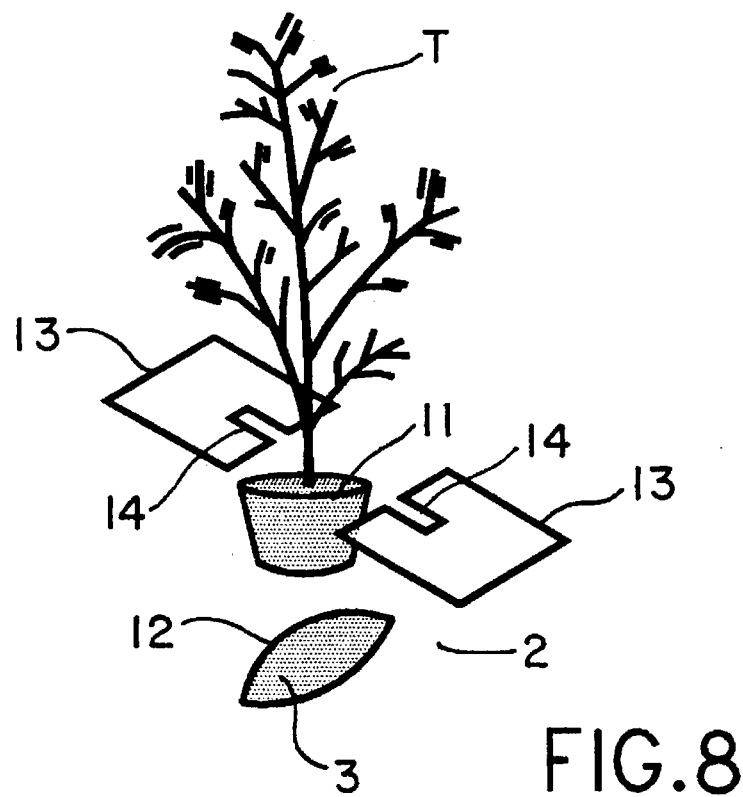
FIG. 8 is a perspective view showing a major part of a different embodiment of the plant-growing method of the present invention.
Figure 9:
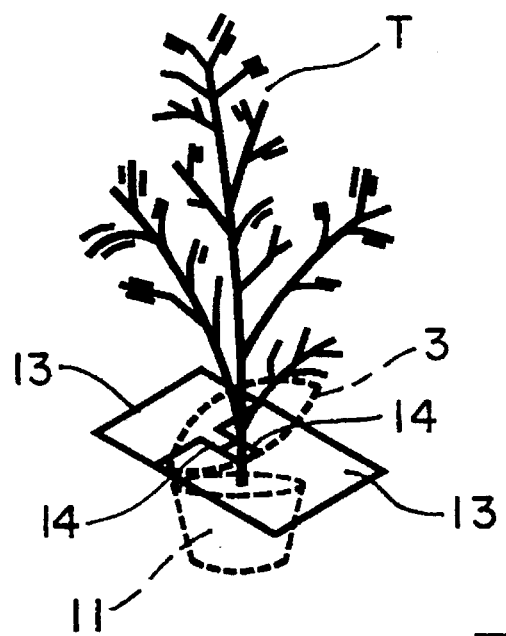
FIG. 9 is a perspective view showing the major part of the different embodiment of the plant-growing method of the present invention.

It is to be noted in this instance that the growth of trunks of the trees T may force the slits constituting the openings 3 to widen. To avoid this, means depicted in FIGS. 8 and 9 are employed in this embodiment. More specifically, a pair of sheets 13 each having a notch 14 formed on its one end are prepared and disposed on the inside of the openings in such a manner that their respective notches 14 confront each other orthogonally to the slits constituting the openings 3 and that the confronting notches 14 are overlapped to sandwich the trunks of the trees T, whereupon the trunks are entirely surrounded by the notches 14.

Eventually suspended along the wall surface, as described hereinabove, a greening method of the present invention works, but naturally the wall surface may be upright or slant. On this assumption, description will be given of the soil, watering means and the kinds of trees suitable for the greening device of the present invention.

(SOIL)

The soil is preferably an artificial lightweight soil for the purpose of reducing the load upon the suspension, but ordinary natural soil is available for the slant wall surface of 60 degrees or less.

(WATERING MEANS)

Figure 3:
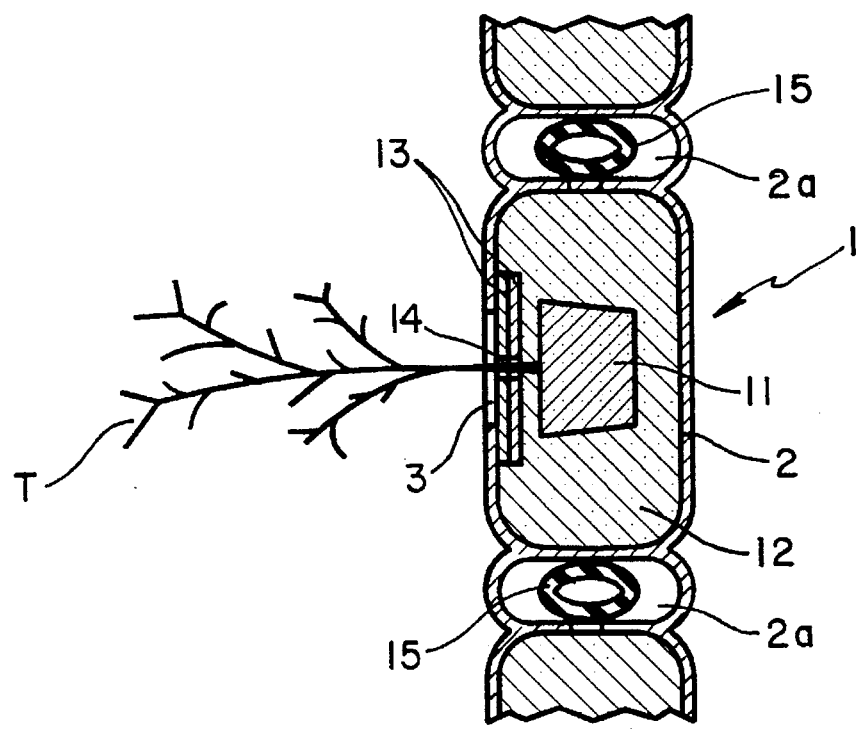
FIG. 3 is a sectional view showing a major part of another embodiment.
Figure 4:
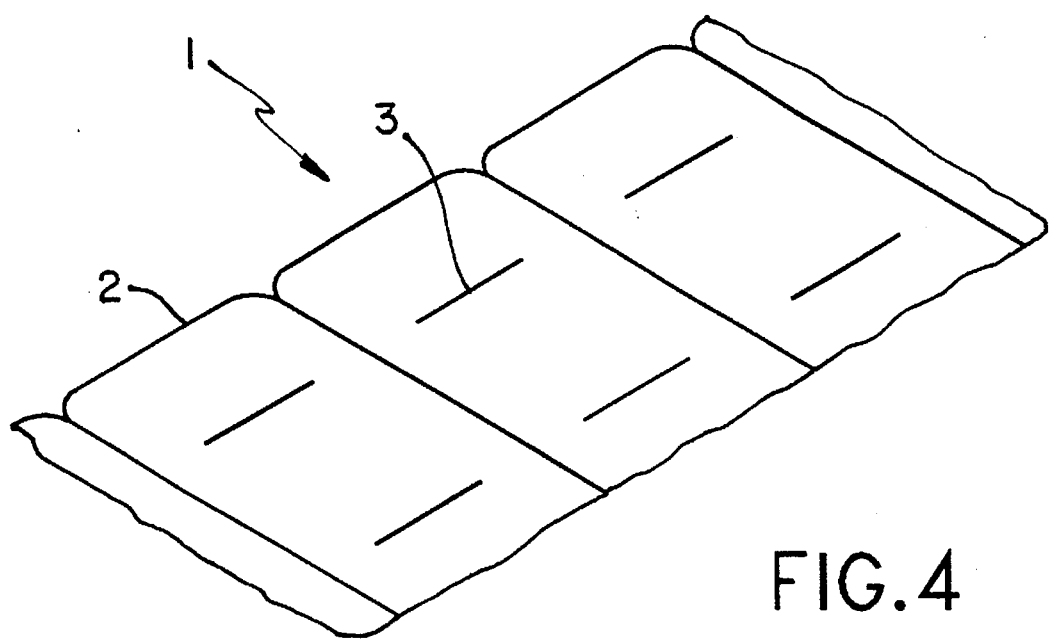
FIG. 4 is a perspective view showing a step in the plant-growing method of the present invention.
Figure 5:
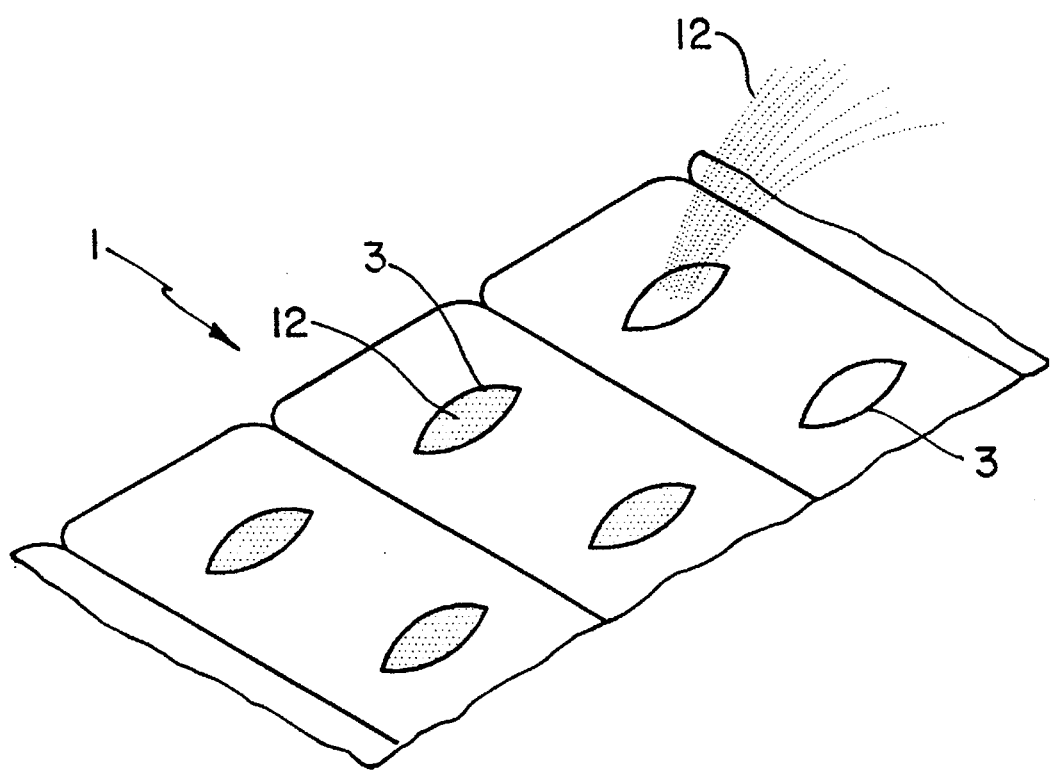
FIG. 5 is a perspective view showing a step in the plant-growing method of the present invention.
Figure 6:
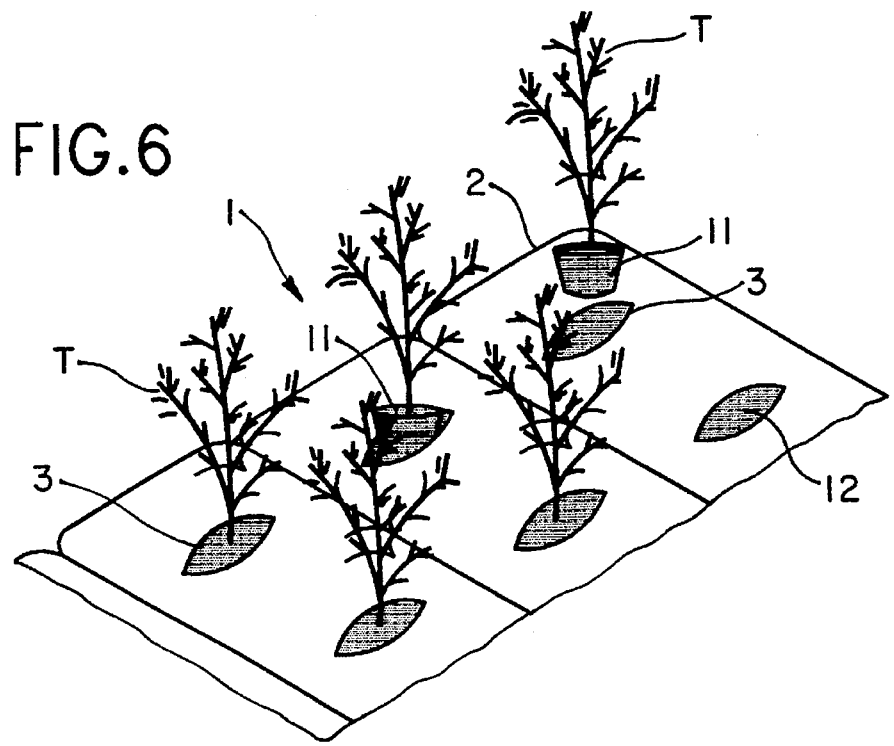
FIG. 6 is a perspective view showing a step in the plant-growing method of the present invention.
Figure 7:
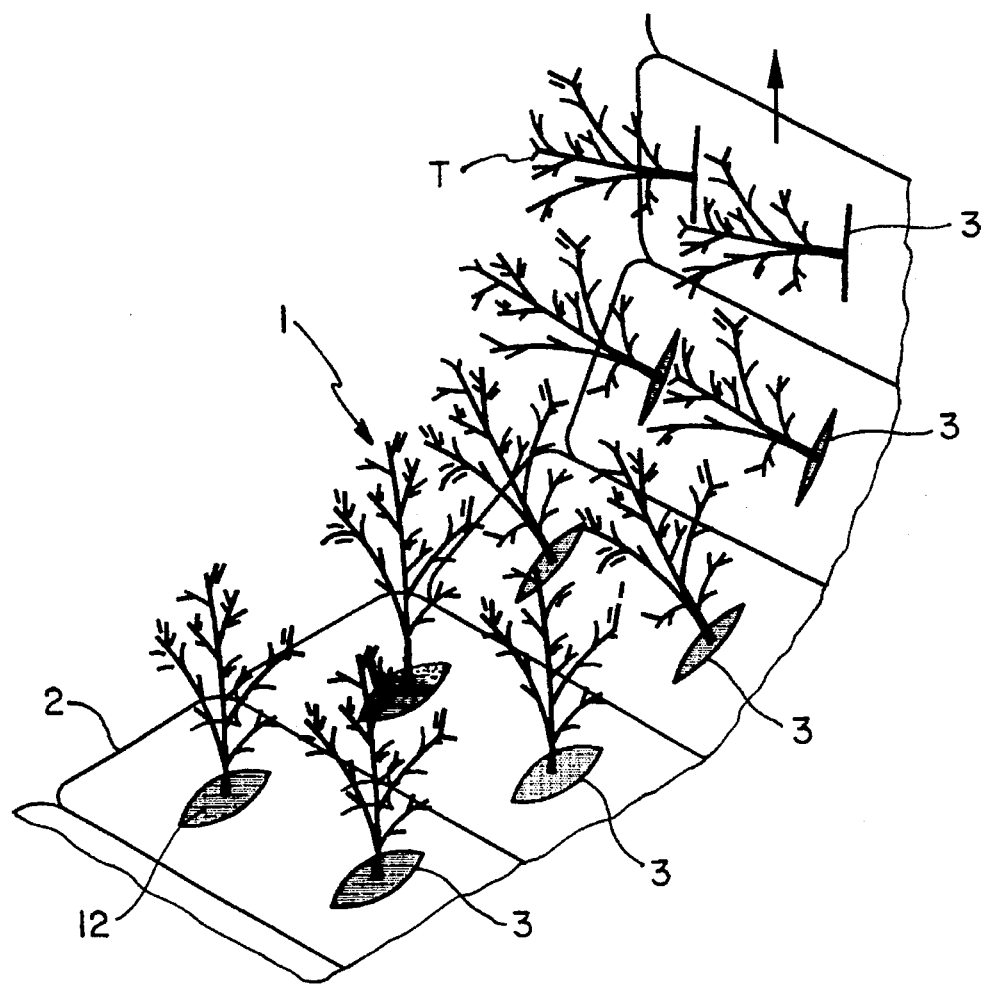
FIG. 7 is a perspective view showing a step in the plant-growing method of the present invention.

Referring back to FIG. 3, depicted is a technique disclosed as unique means practicable in the present invention. Interposed between the adjacent compartments 2 of the bag 1 are spaces 2a for receiving watering pipes 15 which are sequentially coupled with one another in the direction of the overall length of the bag 1. Thus, by supplying water into the pipe 15 in the uppermost space 2a of the suspended greening device, the water is allowed to flow down in sequence into the pipes 15 in the lower spaces 2a while simultaneously being supplied through the pipes 15 into the compartments 2. It is to be especially noted that the above watering means can be used for the upright wall surface and slant wall surface of 60 degrees or more, but that for the slant wall surface of less than 60 degrees the watering is preferably performed with the aid of a high-molecular soil water retention agent.

(KIND OF TREES)

The most suitable trees are, for instance, *Juniperus Chinensis, Juniperus Conferta, Euonymus Fortunei*, Cotoneaster, *Cotoneaster Horizontal, Vitex Rotundifolia*, etc., but in the case of the slant wall surface less than 60 degrees, all trees being commonly planted are available.

Figure 10:
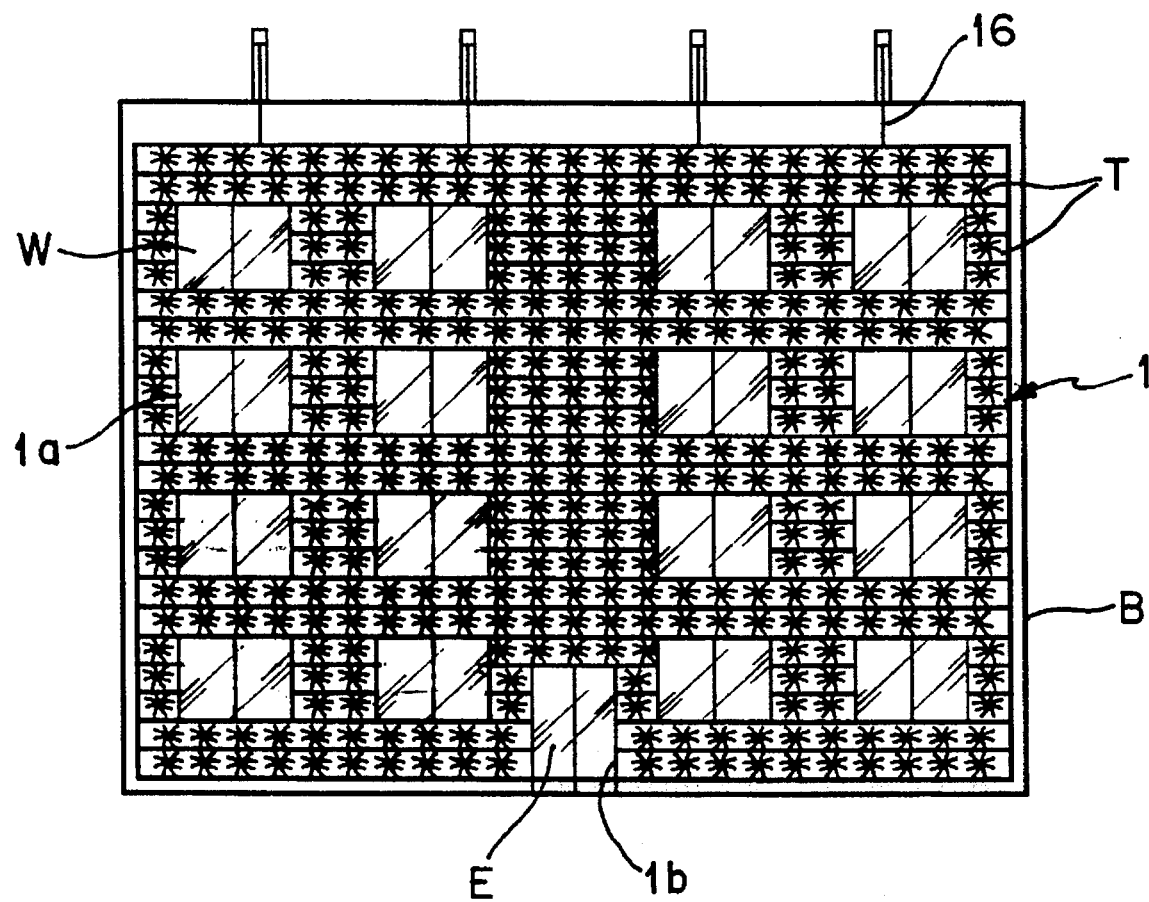
FIG. 10 is a front elevational view of a building whose wall surface is greened by means of the plant-growing method according to the present invention.

Referring finally to FIG. 10, there is depicted, by way of example, a building whose wall surface is greened by means of the present invention.

As is apparent from this diagram, if a wall surface has regions undesired to be greened (a door E and windows W in this case), the bag 1 may be provided in advance with openings 1a and a notch 1b, whereby desired greening can be realized in a very simple manner.

The present invention having the above configuration exhibits the following unique effects.

(1) The work for planting the trees can be carried out on the ground and, after planting, the bag has only to be suspended along the wall surface to complete the greening. Thus, there is no need to provide a special overhang or framework on the wall surface as in the prior art or to cause the workers to work on the wall surface, which will ensure the greening by means of an extremely simple technique.

(2) Due to the same reason, upon the maintenance of the trees and replanting, the bag in suspension has only to be let down to allow those works to be performed on the ground, not on the wall surface. This will not only eliminate the need for the framework for those works but also ensure even easier work than done on the wall surface, consequently contributing to a significant reduction in the cost needed for those works.

(3) The same reason will realize without difficulty the greening and its maintenance of the wall surfaces of skyscrapers whose greening has been hitherto impossible for the framework.

(4) The greening is performed for each of the bags to be suspended along the wall surface, and hence the replacement of each bag in whole will ensure a rapid and easy removal or replacement of the trees. Accordingly, this will realize with significant ease the seasonal replacement of the trees or the temporary greening for events or advertisements which have been hitherto impossible, which may contribute to the development of new manner of business in gardening.

(5) The greening is performed for each of the bags to be suspended along the wall surface, and hence the changes in the shapes of the bags will easily realize an accurate greening in accordance with the configurations of the wall surface, and the provision of the notches or windows in the bags will easily realize a greening avoiding obstacles on the wall surfaces.

(6) The same opening serves as a soil loading port, tree planting port and trunk exposure port, which results in an extremely simple structure of the bags, thus lessening labors required for the method itself as well as realizing superior greening at a very reduced cost.

While particular embodiments of the present invention have been illustrated and described, it would be obvious to those skilled in the art that various other changes and modifications can be made without departing from the spirit and scope of the present invention. It is therefore intended to cover in the appended claims all such changes and modifications that are within the scope of the present invention.

What I claim is:

1. A method of plant growing and greening upright vertical or slant wall surfaces comprising the steps of:

providing a flexible bag having a plurality of separate compartments sequentially juxtaposed in a direction of the overall length of said bag, said compartments each having a plurality of spaced openings communicating with the exterior of said bag;

said plurality of openings being formed on each of said plurality of compartments and each opening formed as a slit;

loading soil through said openings into corresponding compartments with said bag laid horizontally;

planting trees through individual openings into respective compartments;

suspending said bag which has been planted with trees along a wall surface in the direction of the overall length of said bag while allowing trunks of the trees to be exposed away from said wall surface exteriorly through said openings;

supplying water into said compartments of said bag to promote the growth of the trees planted therein; and providing a pair of rigid sheets each having at one end edge thereof a slit-like notch and disposing said rigid sheets on the inside of a respective opening, said rigid sheets being overlapped orthogonally to a corresponding slit constituting each opening of each compartment with said slit-like notches facing each other to sandwich the trunk of a tree therebetween.

2. A method of plant growing and greening upright vertical or slant wall surfaces comprising the steps of:

providing a flexible bag having a plurality of separate compartments sequentially juxtaposed in a direction of the overall length of said bag, said compartments each having a plurality of spaced openings communicating with the exterior of said bag;

loading soil through said openings into corresponding compartments of said bag;

planting trees through individual openings into respective compartments;

providing a pair of rigid sheets each having at one end edge thereof a slit-like notch and disposing said rigid sheets on the inside of a respective opening, said rigid sheets being overlapped orthogonally to a corresponding slit constituting each opening of each compartment with said slit-like notches facing each other to sandwich the trunk of a tree therebetween;

suspending said bag which has been planted with trees along a wall surface in the direction of the overall length of said bag while allowing trunks of the trees to be exposed away from said wall surface exteriorly through said openings; and supplying water into said compartments of said bag to promote the growth of the trees planted therein.

* * * * *